United States Patent
Chauzy et al.

(10) Patent No.: US 7,101,482 B2
(45) Date of Patent: Sep. 5, 2006

(54) METHOD AND FACILITY FOR TREATMENT OF SLUDGE DERIVE FROM BIOLOGICAL WATER PURIFICATION FACILITIES

(75) Inventors: Julien Chauzy, Semur-En-Auxois (FR); Lucie Patria, Paris (FR); Didier Cretenot, Senlis (FR)

(73) Assignee: OTV S.A., Saint Maurice Cedex (FR)

( * ) Notice: Subject to any disclaimer, the term of this patent is extended or adjusted under 35 U.S.C. 154(b) by 28 days.

(21) Appl. No.: 10/523,661

(22) PCT Filed: Aug. 5, 2003

(86) PCT No.: PCT/FR03/02469

§ 371 (c)(1),
(2), (4) Date: Feb. 4, 2005

(87) PCT Pub. No.: WO2004/014809

PCT Pub. Date: Feb. 19, 2004

(65) Prior Publication Data

US 2006/0163155 A1    Jul. 27, 2006

(30) Foreign Application Priority Data

Aug. 5, 2002    (FR)    ................................. 02 09969

(51) Int. Cl.
C02F 3/30    (2006.01)
C02F 3/12    (2006.01)
C02F 11/02    (2006.01)

(52) U.S. Cl. .................. 210/605; 210/609; 210/613; 210/615; 210/622; 210/623; 210/631; 210/632; 210/150; 210/259

(58) Field of Classification Search ................ 210/605, 210/609, 612, 613, 615–617, 621–623, 631, 210/632, 150, 151, 252, 259
See application file for complete search history.

(56) References Cited

U.S. PATENT DOCUMENTS

| 3,300,401 A | 1/1967 | Sontheimer |
| 3,926,794 A | 12/1975 | Vahldieck |
| 4,370,235 A | 1/1983 | Suzuki et al. |
| 4,915,840 A * | 4/1990 | Rozich ....................... 210/605 |
| 5,651,891 A | 7/1997 | Molof et al. |
| 6,033,571 A * | 3/2000 | Hasegawa et al. .......... 210/613 |
| 2003/0136733 A1* | 7/2003 | Zhang et al. ................ 210/609 |
| 2003/0217968 A1* | 11/2003 | Goel et al. ................... 210/605 |
| 2004/0004038 A1* | 1/2004 | Yamaguchi et al. ........ 210/623 |

FOREIGN PATENT DOCUMENTS

| EP | 0924168 | 6/1999 |
| FR | 2 276 269 | 6/1975 |
| JP | 11-10191 | * 1/1999 |
| JP | P2003-47988 | * 2/2003 |

* cited by examiner

Primary Examiner—Fred G. Prince
(74) Attorney, Agent, or Firm—Coats & Bennett

(57) ABSTRACT

A process and system for treating excess sludge produced from a biological treatment system. The process includes biologically treating water or wastewater and producing excess sludge. The excess sludge is directed to a solubilizer where the sludge is solubilized. The solubilized sludge is directed to a liquid/solid separator, which separates the solubilized sludge into a liquid fraction and a solid fraction. The process further includes at least partially digesting the liquid fraction and directing the partially digested liquid fraction to the biological treatment system where the liquid fraction is subjected to further treatment. Finally, the solid fraction is subject to further solubilization.

35 Claims, 2 Drawing Sheets

METHOD AND FACILITY FOR TREATMENT OF SLUDGE DERIVE FROM BIOLOGICAL WATER PURIFICATION FACILITIES

This application is a U.S. National Stage application of PCT Application No. PCT/FR03/02469, with an international filing date of Aug. 5, 2003. Applicant claims priority based on French application serial No. 02 09969 filed Aug. 5, 2002.

The invention relates to the domain of biological treatment of effluents for purification, such as particularly but not exclusively town or industrial waste water. More precisely, the invention relates to the treatment of sludge produced during biological treatment of these effluents.

This type of biological treatment process consists of putting the effluent to be purified into contact with the biomass capable of degrading the pollution contained in it. The use of such treatment leads to a progressive increase in the quantity of biomass and the need to evacuate the excess biomass. This excess biomass is hereinafter referred to as "excess sludge".

One important problem that arises with the biological treatment of effluents consists of the ever-increasing quantities of these excess sludges.

Various technical solutions have been envisaged to reduce these quantities.

These techniques include incineration, drying, wet oxidation (OVH), chemical and biological treatment in order to obtain products that can be used in agriculture, digestion, in other words essentially methanisation (or anaerobic digestion), thermophilic aerobic stabilisation, or the use of fungi.

Methanisation and thermophilic aerobic digestion reduce the volume of excess sludge by degrading some of the volatile matter (MV) contained in them. This degradation can be as much as 50% of the initial quantity of sludges. Apart from the reduction of this volatile matter, these processes lead to digestion and hygienisation of the excess sludges.

A proposal to increase the digestion efficiency of sludges has already been made in the state of the art, by applying a preliminary treatment step to them.

Thus, it has been proposed to apply a preliminary treatment consisting of a mechanical grinding, for example, to the said sludges on the upstream side of an anaerobic digester, or an ultrasound treatment.

These preliminary treatments reduce the residence time of sludges in digesters, while maintaining a large reduction of volatile matter in the sludge. However, this type of preliminary treatment consists at best of eliminating 60% of volatile matter in the sludges, which is why it is necessary to eliminate residual excess sludge after digestion. Moreover, it requires the use of relatively expensive devices.

Another solution based on the action of ozone has also been proposed. Thus for example, the process described in European patent application EP A 0 645 347 divulges to make ozone act on the mixed liquor recirculated in the biological pond in order to reduce the production of excess sludge. The main disadvantage of this technique is difficulties inherent to the use of ozone that is a highly oxidising reagent, and its implementation cost.

The main purpose of this invention is to propose a process for the treatment of excess sludge originating from the biological treatment of effluents so that the production of excess sludge can be considerably reduced if necessary.

This purpose is achieved with the invention which divulges a process for treatment of excess sludge originating from at least one installation for the biological purification treatment of effluents leading to the production of excess sludge, of the type comprising at least one solubilisation step and at least one digestion step of the said sludges, characterised in that it comprises at least one liquid/solid separation step of the said solubilised sludges after which the liquid fraction is at least partially subjected to a digestion step before being sent to the upstream side of the said biological treatment of the said effluents, while the solid fraction of the solubilised sludges is redirected to the said solubilisation step of the said sludges.

With the process according to the invention, digestion times are considerably reduced. Digestion of the liquid phase only requires approximately one day, compared with approximately 15 to 20 days if digestion of the liquid phase had to be done mixed with the solid phase. A digestion time of this order would be necessary to hydrolyse dry matter contained in the sludges.

Moreover, digestion of the liquid phase alone advantageously means that the equipment necessary for digestion may be smaller, since the residence time necessary for carrying out reactions on the soluble COD is shorter than the residence time necessary for degradation of particulate COD.

Furthermore, the digester treats a phase containing relatively little dry matter, which contributes to reducing the equipment and operating costs, while leaving it possible to use a digester with a lower capacity than a digester that has to treat larger volumes containing higher contents of dry matter.

Note that for this description, the term "digestion" refers to any process known to those skilled in the art for degradation of sludges by a biomass. In particular, this term includes:

anaerobic digestion, also called methanisation, that degrades the organic molecules of sludges into $CO_2$, $CH_4$ and $NH_3$; anaerobic digestion may be mesophilic, in other words done at a temperature varying from 30° C. to 37° C., or thermophilic, in other words carried out at a higher temperature;

thermophilic aerobic stabilisation carried out at a temperature of between 45° C. and 70° C., and preferably between 50° C. and 65° C., that consists of biological oxidation carried out by injection of air into a stirred tank.

According to one variant solution, the process includes a complementary intermediate step for solubilisation of the said solid fraction, on the upstream side of where the said sludges are sent to the said solubilisation step. This complementary solubilisation step preferably uses a different solubilisation means from that used in the main solubilisation step of the said sludges, in order to improve solubilisation by the use of complementary means. Thus, if the solubilisation step of the said sludges uses thermal hydrolysis as a solubilisation means, the intermediate solubilisation step of the said solid fraction can use a mechanical solubilisation means (such as ultrasounds or grinding) or a chemical solubilisation means (for example such as ozone or acid).

In this way, the process can further reduce or even completely eliminate production of sludge.

According to one advantageous solution, the process includes a thickening step of the said sludges, or even a dehydration step, on the upstream side of the said main solubilisation step of the said sludges.

In this case, the overflow of the said thickening step is preferably sent to the upstream side of the said biological treatment of the said effluents.

Thickening the sludges in this way contributes to optimising the solubilisation step.

Advantageously, the said thickening step is done with the addition of a polymer.

The use of a polymer can improve thickening of sludges.

Thickening may possibly be replaced by dehydration of sludges, which will be possible particularly when the planned solubilisation step will be thermal hydrolysis.

According to one preferred solution, the said solubilisation step includes at least one step in the following group:

oxidising or non-oxidising thermal hydrolysis (thermal hydrolysis means solubilisation of particulate organic material under the action of heat). This hydrolysis may be carried out with or without the presence of an oxidant);

chemical hydrolysis (using acid, base, ozone or hydrogen peroxide);

biological hydrolysis;

enzymatic hydrolysis;

ultrasound treatment;

grinding;

electroporation.

Note that several of these techniques may be combined to achieve an even greater reduction in the sludges.

According to one preferred solution, the said thermal hydrolysis step is carried out at a temperature of between 50° C. and 180° C., and at a pressure between 2 and 40 bars.

Preferably, the said thermal hydrolysis step is carried out at a temperature of about 175° C. and a pressure of about 15 bars.

Note also that temperature and pressure conditions recommended by this invention for the thermal hydrolysis step are significantly less severe than conditions generally encountered in wet oxidation (OVH) reactions for which temperatures between 180° C. and 300° C., and pressures up to 120 bars are usually used, with the objective of destroying organic material. These conditions can deactivate biomass so as to break the cellular membrane and solubilise the cellular liquid thus released, but surprisingly without causing the formation of significant quantities of insoluble mineral residues (oxides, carbonates, sulphates, etc.) that could not be eliminated during the digestion step and that would hinder functioning of this step and thus would limit possibilities of reducing the quantity of sludges to be evacuated.

Advantageously, the said thermal hydrolysis step is carried out for between 10 and 180 minutes. Preferably, the said thermal hydrolysis step is carried out for about 30 minutes.

However, the thermal hydrolysis step recommended above may be used for a variable treatment time, depending particularly on the effluent to be treated.

Advantageously, the said oxidising thermal hydrolysis step is done using at least one of the oxidising agents belonging to the following group:

air;

oxygen;

air enriched with oxygen;

hydrogen peroxide;

ozone.

According to a first embodiment, the said digestion step is of the anaerobic type.

According to a second embodiment, the said digestion step is of the aerobic type.

According to either embodiment, the said digestion step is of the mesophilic type.

According to one alternative, the said digestion step is of the thermophilic type.

In either case, the said digestion step is advantageously performed using free and/or fixed cultures.

Advantageously, the said digestion step is carried out for between 1 day and 20 days. Preferably, the said digestion step is carried out for between 1 day and 5 days.

With the process according to the invention, the time necessary for the digestion step can be considerably shortened, to the order of a few days, or only one day, unlike what would be necessary to digest solubilised sludges directly, which would be about 20 days.

According to one preferred solution, the said liquid/solid separation step is performed by centrifuging and/or filtration and/or dewatering and/or by settlement.

Thus, the results obtained are much better than with other techniques, particularly with regard to a settlement.

Preferably, the said liquid/solid separation step is done with the addition of a flocculent.

Note also that according to one variant of the invention, the biological treatment is associated with a separative membranes technique.

This type of addition helps to improve the efficiency of centrifuging.

The invention also relates to an installation for implementation of a process like that described above, including a biological effluent purification unit, characterised in that it comprises:

at least one solubilisation unit of the said sludges;

at least one liquid/solid separation unit on the upstream side of the said solubilisation unit;

at least one digester, and in that it comprises:

means of routing the liquid fraction output from the said liquid/solid separation unit, to the said digester;

means of routing the solid fraction output from the said liquid/solid separation unit to the said solubilisation unit of the said sludges;

means of routing the said digested liquid fraction to the said biological treatment unit of the said effluents.

According to one advantageous solution, the said liquid/solid separation unit comprises at least one of the following means:

press filter, centrifuge;

dewatering table or screw;

membrane;

settlement tank.

Preferably, the said solubilisation unit comprises at least one thermal hydrolysis unit.

Note that this oxidising thermal hydrolysis unit may be replaced or combined with other solubilisation techniques such as non-oxidising thermal hydrolysis, chemical hydrolysis, biological hydrolysis, enzymatic hydrolysis, ultrasound treatment or grinding.

According to a first embodiment, the said solubilisation unit comprises a stirred reactor.

According to a second embodiment, the said solubilisation unit comprises an unstirred reactor.

In either embodiment, the said digester is of the fixed and/or free culture type.

Therefore, it can be understood that digestion may be one type or the other type, or a hybrid type.

According to a first variant, the said digester is of the type with an ordered lining.

According to another variant, the said digester is of the type with a bulk lining.

Preferably, the said digester is of the Upward-flow Anaerobic Sludge Bed (UASB) type with pellets.

According to one advantageous solution, the installation comprises at least one thickener of the said sludges on the upstream side of the said solubilisation unit.

In this case, the installation includes means of routing the overflow from the said thickener onto the said biological purification unit of the said effluents.

Advantageously, the installation comprises an intermediate unit for solubilisation of the said solid fraction on the upstream side of the said solubilisation unit of the said sludges, including a solubilisation means different from that used in the solubilisation unit for the said sludges.

Other characteristics and advantages of the invention will become clearer after reading the following description of two embodiments of an installation for use of a process according to the invention and tests carried out using this installation, and the appended figures, wherein.

Figure 1:
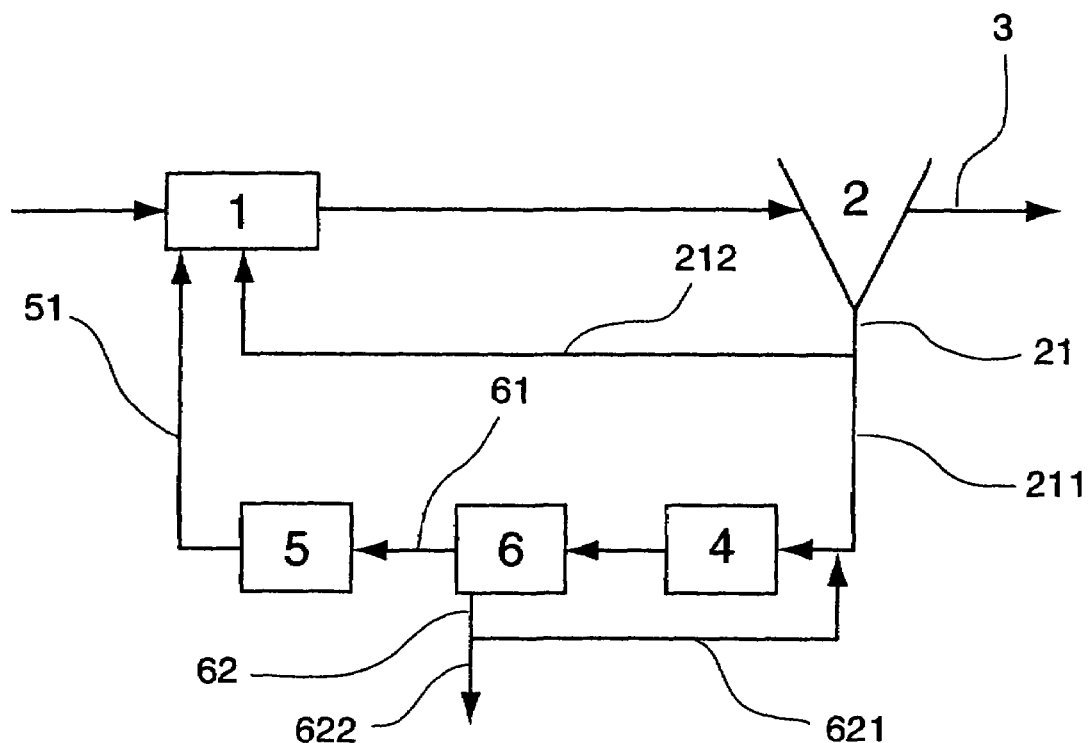
FIG. 1 shows an installation in which excess sludges are solubilised directly before being directed to the liquid/solid separation unit.

The installation shown in FIG. 1 was used to treat excess sludges from a biological treatment installation 1, for example using the so-called activated sludges process. The biological treatment installation is not limited to activated sludges, but is also applicable to processes combining biological processes and membrane separation techniques, which may be of the immersed or non-immersed membrane type (process known under the name of membrane bioreactors), or processes with fixed cultures, processes with hybrid cultures, etc.

According to one variant, the said installation also includes separation means on membranes (microfiltration, ultrafiltration, nanofiltration).

Conventionally, the biological treatment installation is coupled to a clarifier 2 at the output from which the treated water is recovered through a pipe 3. Note that in another embodiment shown in FIG. 3, this clarifier may include membranes.

This installation also includes a thermal hydrolysis unit 4 for excess sludge from the clarifier 2 through a pipe 21 and a digester 5.

According to the invention, excess sludges solubilised by the thermal hydrolysis unit 4 are routed to a liquid/solid separation unit 6 that separates the solubilised sludges into a liquid fraction routed through a pipe 61, and a solid fraction 62. This liquid/solid separation unit 6 comprises a dehydration step, for example centrifuging.

The liquid fraction is routed to the digester 5 through a pipe 61 before being re-routed to the biological treatment installation 1 through a pipe 51, while the solid phase is re-routed to the thermal hydrolysis unit 4 through a pipe 621.

Furthermore, a pipe 212 is provided to re-route some of the excess sludges from the clarifier 2 directly to the biological treatment installation 1.

Note that extractions from the solid phase originating from the pipe 62 starting from the liquid/solid separation unit 6 may be made using extraction means 622.

Figure 2:
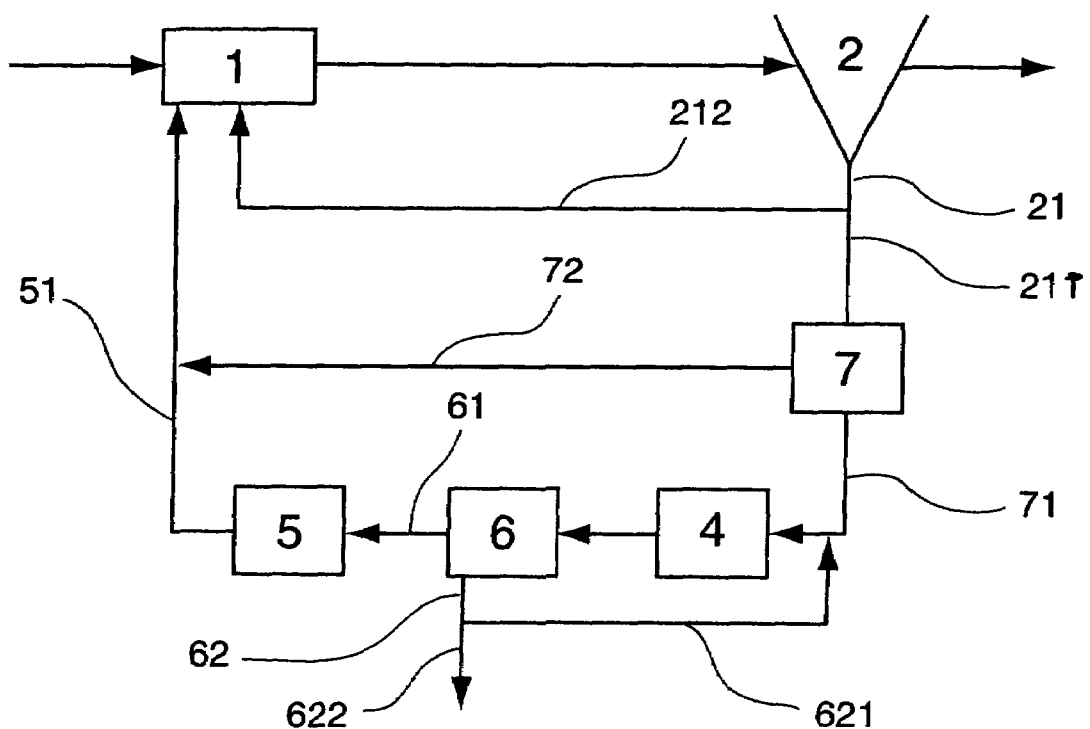
FIG. 2 shows a second embodiment of an installation according to the invention according to which excess sludges are previously thickened or dehydrated before being solubilised.

According to a second embodiment illustrated in FIG. 2, the installation comprises a thickener 7 for excess sludges routed through pipe 211, in addition to means identical or similar to those described with reference to FIG. 1.

The thickener 7 is composed of a thickening screw coupled to means of adding a polymer on the upstream side of the screw.

According to this embodiment, the overflow from the thickener is routed through a pipe 72 to the biological treatment installation or to digestion 5, while the underflow is directed to the thermal hydrolysis unit 4 through a pipe 71.

Note that according to the variants of the first and/or second embodiment that have just been described, it would be possible to have a unit 4' to solubilise the solid phase from the separation unit 6 and routed through the pipe 621 to the thermal hydrolysis unit 4.

Figure 3:
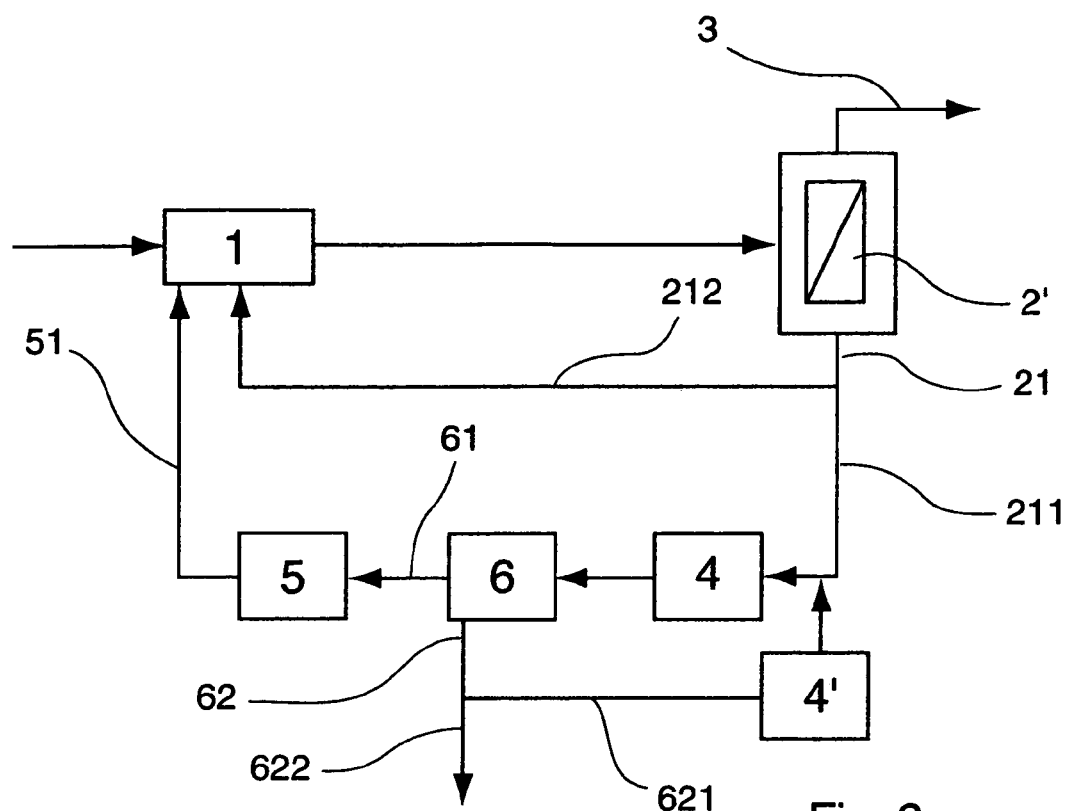
FIGS. 3 and 4 show the first two embodiments of an installation according to the invention according to which the solid fraction of solubilised excess sludges is subjected to another solubilisation by a means preferably different from the means used previously.
Figure 4:
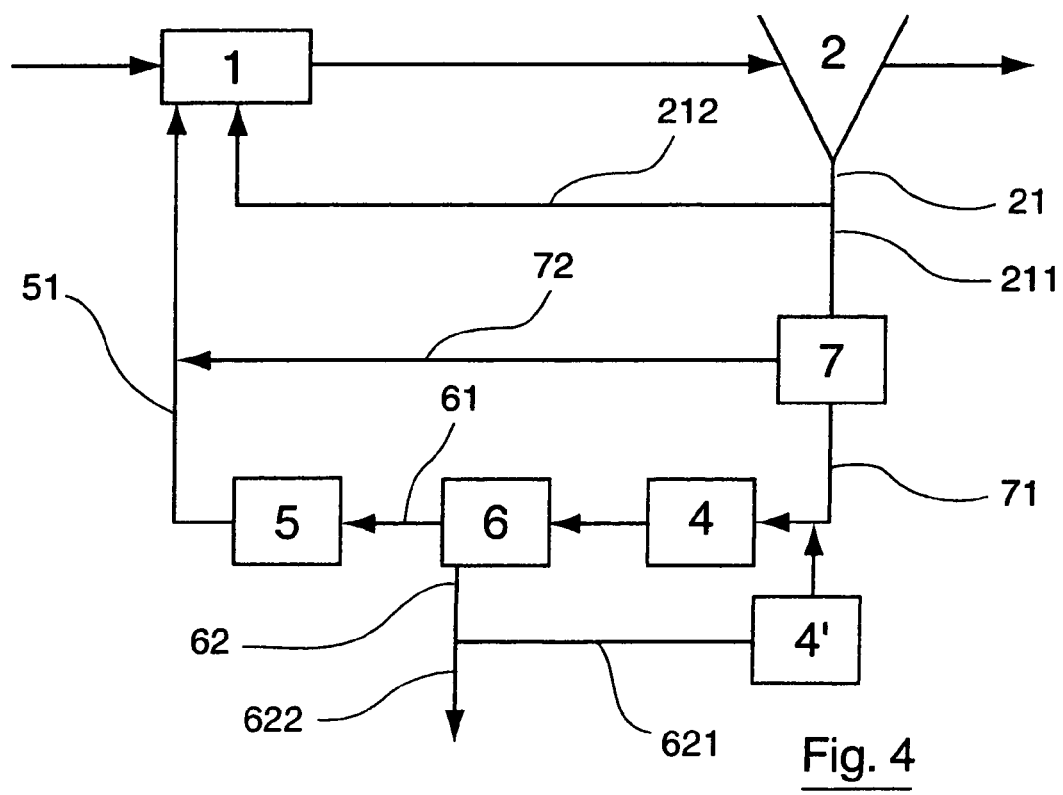

This unit 4' preferably uses means different from those used by unit 4. These variants are shown in FIGS. 3 and 4.

Tests were carried out according to the operational method for the installation described with reference to FIG. 2. The results are given below.

The tests were carried out with sludges from an urban residual water treatment station equipped with a biological pond operating in prolonged aeration. The concentration of these sludges is 4–5 g SS/L before thickening.

Thickening is done using a thickening screw, with the addition of a polymer on the upstream side (5–6 kg of polymer per tonne of dry matter). The quality of thickened sludges obtained is as follows:

| | |
|---|---|
| Dry matter MS (g/L) | 35–50 |
| Suspended solids SS (g/L) | 34–49 |
| Total COD (mg 02/L) | 35000–50000 |
| Soluble COD (mg 02/L) | 800–1000 |
| Total soluble nitrogen (mg/L) | 7–15 |
| Ammonium (mg/L) | 1–5 |
| Total soluble phosphorus | 10–12 |
| Phosphates (soluble) (mg/L) | 8–10 |
| Volatile matter | 70–75% of dry matter |

The thermal hydrolysis treatment is applicable to thickened sludges as follows:

| | |
|---|---|
| Temperature: | 175° C. |
| Pressure: | 15 bars |
| 02/total COD ratio: | 0.1 |
| Residence time: | 40 minutes |
| Reactor volume: | 400 litres |

The characteristics of the sludges thickened after thermal hydrolysis are as follows:

| | |
|---|---|
| Dry matter MS (g/L) | 35–50 |
| Suspended solids SS (g/L) | 25–35 |
| Total COD (mg 02/L) | 35000–50000 |
| Soluble COD (mg 02/L) | 12000–18000 |
| Total soluble nitrogen (mg/L) | 900–12000 |
| Ammonium (mg/L) | 200–250 |
| Total soluble phosphorus | 180–200 |
| Phosphates (soluble) (mg/L) | 160–180 |
| Volatile matter | 60–65% of dry matter |

Liquid/solid separation tests were carried out in the laboratory. It has been observed that thermally treated sludges do not settle well. Consequently, centrifuging was selected for the liquid/solid separation step.

Centrifuging tests carried out in the laboratory without any added polymer, resulted in a supernatant (or float) with the following characteristics:

| | |
|---|---|
| Total COD (g 02/L) | 15.7 |
| Soluble COD (g 02/L) | 16.1 |
| Dry matter (mg/L) | 14300 |
| Suspended solids (mg/L) | 540 |

After segregation, the solid phase containing most of the suspended solids is recycled to thermal hydrolysis.

Simulation tests for recirculation were carried out in the laboratory on a small autoclave in order to solubilise these suspended solids to the maximum. The experimental protocol was as follows:

heat treatment of a thickened sludge (thermal hydrolysis 1);

liquid/solid separation by centrifuging;

heat treatment of the solid phase (thermal hydrolysis 2);

liquid/solid separation by centrifuging;

heat treatment of the solid phase (thermal hydrolysis 3);

etc.

Solubilisation of dry matter was observed after a sequence of seven thermal hydrolyses between each of which the sludges were centrifuged.

The solubilisation results of suspended solids are as follows:

| | Solubilisation of the thermal treatment n (%) | Accumulated solubilisation (%) |
|---|---|---|
| Thermal hydrolysis 1 | 43 | 43 |
| Thermal hydrolysis 2 | 19 | 56 |
| Thermal hydrolysis 3 | 13 | 62 |
| Thermal hydrolysis 4 | 8 | 65 |
| Thermal hydrolysis 5 | 7 | 66 |
| Thermal hydrolysis 6 | 6 | 68 |
| Thermal hydrolysis 7 | 7 | 70 | where:

solubilisation of thermal treatment n (%)=(soluble COD of the treated sludge)/(total COD of the treated sludge), and, accumulated solubilisation (%)=(solubilised COD after n thermal treatments)/(total COD of the initial thickened sludge).

Moreover, biological treatment tests were carried out in the laboratory on the liquid phase output from the liquid/solid separation step 6.

These tests were carried out on the following effluent:

| | |
|---|---|
| Dry matter MS (g/L) | 11.7 |
| Suspended solids SS (g/L) | 0.61 |
| Volatile matter MV (g/L) | 9.7 |
| Suspended volatile matter MVS (G/l) | 0.54 |
| COD (g 02/L) | 15.5 |

-continued

| Type of biological treatment: | |
|---|---|
| temperature: | 30° C. |
| type: | methanisation on liquid phase |
| pH: | 6.7 to 7 |
| Reduction in COD: | 70% |

In conclusion, this type of line according to the invention can significantly solubilise the COD of the thickened sludge (>60%) so that this soluble COD can then be reduced through the digestion step.

Sludges thickened on the upstream side of the line had a concentration of 35–50 g/L of total COD and 35–50 g/L of dry matter. The effluent returned to the station inlet from the downstream side of the line has a concentration of 4 to 5 g/L of total COD and 5–6 g/L of dry matter.

Suspended solids that were not solubilised are extracted from the line at the purge point. This purge represents 20 to 40% of the dry matter entering into the line. Consequently, the reduction of dry matter in sludge production is more than 60%.

Finally, note that an ozonisation step may be applied to the phase returned through the pipe 51 to the inlet of the biological treatment installation in the water, for example to decolorise the water.

Since most suspended solids have been separated from this return through pipe 51, the ozone consumption necessary for the treatment will be considerably less than the amount that would have been necessary for treatment of the entire sludge return.

What is claimed is:

1. A process for treating excess sludge from a biological treatment system comprising:
   a. biologically treating water or wastewater and producing excess sludge;
   b. solubilizing the sludge;
   c. subjecting the solubilized sludge to a liquid-solid separation process and separating the solubilized sludge into a liquid fraction and a solid fraction;
   d. at least partially digesting the liquid fraction and directing the at least partially digested liquid fraction to the biological treatment system for further treatment; and
   e. solubilizing the solid fraction of the solubilized sludge.

2. The process of claim 1 wherein the excess sludge is solubilized in a first solubilizer and wherein the solid fraction of the solubilized sludge is solubilized in a second solubilizer.

3. The process of claim 1 including thickening or dehydrating the sludge prior to the sludge being solubilized.

4. The process of claim 3 wherein the thickening or dehydration process produces an overflow that is directed to the biological treatment system.

5. The process of claim 4 including adding a polymer to the sludge to thicken the sludge.

6. The process of claim 1 wherein the step of solubilizing the sludge includes at least one step taken from the group consisting of:
   a. oxidizing thermal hydrolysis;
   b. non-oxidizing thermal hydrolysis;
   c. chemical hydrolysis;
   d. enzymatic hydrolysis;
   e. biological hydrolysis;
   f. ultrasound treatment;

g. grinding; and h. electroporation.

7. The process of claim 6 wherein the step of solubilizing the sludge includes thermal hydrolysis that is carried out at a temperature between 50° C. and 180° C., and at a pressure of between 2 and 40 bars.

8. The process of claim 7 wherein the thermal hydrolysis step is carried out at a temperature of about 175° C. and at a pressure of about 15 bars.

9. The process of claim 7 wherein the thermal hydrolysis step is carried out for between 10 and 180 minutes.

10. The process of claim 9 wherein the thermal hydrolysis step is carried out for about 30 minutes.

11. The process of claim 6 wherein solubilizing the sludge includes an oxidizing thermal hydrolysis step that is carried out using at least one of the oxidizing agents selected from the group consisting of air, oxygen, air enriched with oxygen, hydrogen peroxide, and ozone.

12. The process of claim 1 including anaerobically digesting the liquid fraction.

13. The process of claim 1 including aerobically digesting the liquid fraction.

14. The process of claim 12 wherein the digestion step is of the mesophilic type.

15. The process of claim 12 wherein the digestion step is of the thermophilic type.

16. The process of claim 12 wherein the digestion step is performed using free and/or fixed cultures.

17. The process of claim 12 wherein the digestion step is carried out for between 1 day and 20 days.

18. The process of claim 17 wherein the digestion step is carried out for between 1 day and five days.

19. The process of claim 1 wherein the process for separating the solubilized sludge into a liquid fraction and a solid fraction is performed by centrifuging, filtration, dewatering, or settlement.

20. The process of claim 1 wherein the liquid/solid separation step is performed with the addition of a flocculant.

21. The process of claim 1 wherein the biological treatment system employs a biological treatment process associated with a separative membrane technique.

22. A system for implementing the process of claim 1 comprising at least one solubilization unit for solubilizing sludge; at least one liquid/solid separation unit located downstream of the solubilization unit; at least one digester; means for routing a liquid fraction from the liquid/solid separation unit to the digester; means for routing a solid fraction from the liquid/solid separation unit to the solubilization unit; and means for routing the digested liquid fraction to the biological treatment system.

23. The system according to claim 22 wherein the liquid/solid separation unit is taken from the group consisting of a press filter, centrifuge, dewatering table or screw, membrane, or settlement tank.

24. The system of claim 22 wherein the solubilization unit comprises at least one oxidizing or non-oxidizing thermal hydrolysis unit.

25. The system according to claim 22 wherein the solubilization unit comprises a stirred reactor.

26. The system according to claim 22 wherein the solubilization unit comprises an unstirred reactor.

27. The system of claim 22 wherein the digester is of the fixed and/or free culture type.

28. The system of claim 22 wherein the digester is of the type with an ordered lining.

29. The system of claim 22 wherein the digester is of the type with a bulk lining.

30. The system according to claim 29 wherein the digester is of the UASB type with pellets.

31. The system of claim 22 including thickener for thickening sludge and wherein the thickener is disposed on the upstream side of the solubilization unit.

32. The system of claim 31 including means for routing an overflow from the thickener to the biological treatment system.

33. The system of claim 22 including an intermediate unit for solubilizing said solid fraction on the upstream side of the solubilization unit and wherein the intermediate solubilization unit is different from the solubilization unit.

34. The system of claim 22 including separation means on membranes.

35. The system of claim 22 including means for ozonating the liquid fraction directed to the biological treatment system.

* * * * *